(12) United States Patent
Lindgren

(10) Patent No.: US 7,659,494 B2
(45) Date of Patent: Feb. 9, 2010

(54) LASER TARGET SEEKER DEVICE

(75) Inventor: Mikael Lindgren, Askim (SE)

(73) Assignee: SAAB AB, Linköping (SE)

( * ) Notice: Subject to any disclaimer, the term of this patent is extended or adjusted under 35 U.S.C. 154(b) by 128 days.

(21) Appl. No.: 11/528,566

(22) Filed: Sep. 28, 2006

(65) Prior Publication Data

US 2010/0001119 A1    Jan. 7, 2010

(30) Foreign Application Priority Data

Sep. 28, 2005    (EP) ................................... 05108961

(51) Int. Cl.
*F41G 7/00* (2006.01)
*F42B 15/01* (2006.01)
*F42B 15/00* (2006.01)

(52) U.S. Cl. ........................ 244/3.16; 244/3.1; 244/3.15

(58) Field of Classification Search ........... 244/3.1–3.3; 89/1.11; 356/138, 139.04, 139.07, 139.08, 356/140, 141.1; 250/336.1, 338.1, 339.01, 250/339.02; 359/642, 708, 718
See application file for complete search history.

(56) References Cited

U.S. PATENT DOCUMENTS

| | | | |
|---|---|---|---|
| 4,231,533 A | | 11/1980 | Durig |
| 4,737,028 A | * | 4/1988 | Smith ................ 356/139.08 |
| 5,973,649 A | | 10/1999 | Andressen |
| 6,003,810 A | | 12/1999 | Roze des Ordons et al. |
| 6,565,036 B1 | * | 5/2003 | Palathingal et al. ........ 244/3.16 |
| 6,851,645 B1 | * | 2/2005 | Williams et al. ........... 244/3.16 |
| 6,867,930 B1 | | 3/2005 | Amon et al. |
| 7,042,654 B2 | * | 5/2006 | Knapp ........................ 359/708 |
| 2005/0017278 A1 | | 1/2005 | Yamamoto |
| 2005/0093757 A1 | | 5/2005 | Kiernan, Jr. et al. |

FOREIGN PATENT DOCUMENTS

EP    1248120 A2    10/2002

OTHER PUBLICATIONS

L.B. Lesem et al., "The Kinoform: A New Waveform Reconstruction Device"; IBM J. Res. Develop.; Mar. 1969; pp. 150-155; International Business Machines Corp.*

* cited by examiner

*Primary Examiner*—Bernarr E Gregory
(74) *Attorney, Agent, or Firm*—Venable LLP; Eric J. Franklin

(57) ABSTRACT

A laser target seeker device arranged to receive a laser beam reflected from an object. Detector elements are arranged to detect the reflected laser beam. A processor is arranged to determine the received radiation on the respective detector element in order to determine the origin of the laser beam. A diffractor is arranged relative to the detector elements and configured to diffract the reflected laser beam into portions prior to being detected by the detector elements. The detector elements are arranged to detect the respective portion. A flyable body is for hitting a target by means of a laser beam. A system for hitting a target by means of a laser beam. A method for detecting a laser beam reflected from an object. Use of a kinoform member in a laser target seeker for diffracting a laser beam.

24 Claims, 8 Drawing Sheets

LASER TARGET SEEKER DEVICE

CROSS-REFERENCE TO RELATED APPLICATIONS

This application claims priority to European patent application 05108961.3.

TECHNICAL FIELD

The present invention relates to a laser target seeker device. The present invention further relates to a flyable body, for example a missile. The present invention still further relates to a system according for hitting a target. The present invention further relates to a method for detecting a laser beam.

BACKGROUND

A common way of providing precision controlled weapons is to point at a target by means of a laser beam and allow a flyable weapon such as a missile, bomb or the like to guide itself towards the laser spot. Consequently a laser target seeker is required, being able to distinguish the reflected laser beam in relation to the background. By laser target seeker a target seeker is intended, the task which is to detect reflected laser beams from a target pointed out in the terrain by means of a laser designator and to determine the received radiation on the respective detector element in order to determine the origin of the laser beam. The laser target seeker is also sometimes referred to as a semi-active laser sensor or a SAL-sensor.

The task of the target seeker is to inform where in the field of view of the target seeker the reflected laser spot is present. A common way of achieving this is to use a quadrant detector. A quadrant detector consists of four separate detector elements placed edge to edge in one plane, each of the detector elements being able to view a quadrant of a certain visual field. By measuring and comparing the signal intensity from the four quadrants, i.e. the amount of optical power ending up on each of the four elements, it is possible to determine where the point of balance of the laser reflex is located and thus in which direction to guide e.g. the missile. When the intensity of the signal is equally strong from all four elements the laser reflex is in the centre of the detector and the missile will hit in the middle of the laser reflex. A problem with the quadrant detector is that the accuracy is quite low, which might lead to the missile or the like missing the target.

If a higher accuracy is required in designating the target, the reflex may be focused to an area smaller than the quadrant detector. Then the centre point may be found with higher accuracy but when the reflex is located outside the centre it is not possible to determine how far from the centre it is. This leads to a guide operation which sometimes is referred to as "bang-bang", i.e. strikes are made between the end positions until the reflected beam is in the centre region, at which point a better control may be provided. This means however that a pour aim of the target is the case until the reflex is in the centre. Before that only the quadrant in which the target is located is known.

A more advanced alternative is to use a two dimensional matrix of detector elements to view the entire field of view, e.g. a detector matrix having 4×4 elements. The laser reflex will hit one or more of the elements. By comparing the intensities of the signals the position where the reflex is located may be calculated. An advantage is that a more precise determination of the position of the target in the field of view is achieved. It is also possible to create multiple "images" taken one after the other and use image processing routines to follow and chose among target candidates.

There are however some limitations in using a two dimensional matrix having more than four elements. In a quadrant detector a wire is drawn from the periferal edge of each element to a corresponding amplifier, and the wires consequently do not affect the incoming laser beam hitting the detector elements. Each amplifier can further be located close to the corresponding wire. In the case of a detector matrix having more elements, e.g. 4×4 elements, however, the wires drawn from inner elements will affect the area of the elements, i.e. the fill factor. They are usually drawn along a path where the edges of two adjacent element meet, affecting the fill factor and consequently the accuracy. The amplifiers connected to the wires drawn from the inner elements need to be placed further away, leading to a higher capacitance, which increases the noise and consequently affects the accuracy.

OBJECTS OF THE INVENTION

One object of the present invention is to provide a laser target seeker with improved accuracy.

Another object of the present invention is to provide a flyable body, for example a missile, for striking a target by means of a reflected laser beam with improved accuracy.

A further object of the present invention is to provide a system for striking a target by means of a reflected laser beam with improved accuracy.

Yet another object of the present invention is to provide a method for detecting a from an object reflected laser beam on detector elements achieving a higher accuracy.

SUMMARY OF THE INVENTION

These and other objects, apparent from the following description, are achieved by a laser target seeker, a flyable body, a system, and a method for detecting a laser beam.

Particularly an object is achieved by a laser target seeker comprising diffraction means arranged relative to the detector elements and configured to diffract the reflected laser beam into portions prior to being detected by the detector elements, the detector elements being arranged to detect the respective portion. An advantage is that the detector elements may be separated from each other offering space between them, which results in the fact that the wires may be drawn from each detector element without affecting the detector surfaces, thus increasing the fill factor, and consequently the accuracy. There is further no need for long wires to each detector element which also reduces the capacitance and consequently increases signal to noise ratio, and thus the accuracy.

Preferably the respective individual portions of the laser beam is arranged to be directed to a corresponding respective individual detector element. An advantage is that the accuracy is increased as there is no loss of radiation between the detectors.

Preferably the diffraction means comprises focusing means configured such that the respective diffracted portions of the laser beam is focused prior to being detected by the detector elements. This gives the advantage that the detector elements may be of a smaller size, i.e. having a smaller detecting surface, than detector elements in a conventional detector matrix where the detector elements constitute the detector matrix, connected edge to edge in the same plane. Using smaller detector elements, i.e. the surface of each detector element only covers a portion of conventional detector element, reduces the amount of detector material, i.e. semiconductor material, thus reducing the material costs.

Another advantage, which is a consequence of the smaller detectors, is that the detector elements fits in the same space/area as a conventional detector matrix, and still the fill factor is increased due to the fact of the space created between the detector elements due to their smaller size, in which space the wires from each detector element may be drawn, the wires thus not affecting the detector surface of the detector elements, and consequently the accuracy is increased. As each detector element is substantially smaller the capacitance is correspondingly smaller which simplifies the electronic design and increases the signal to noise ratio, and thus increases the accuracy.

Preferably the detector elements form a detector matrix. This provides a configuration which simplifies directing the laser beam portions towards the detector elements and consequently the detection of the same.

Preferably the diffraction means comprises diffractive elements, each diffraction element being arranged to focus a portion of the laser beam onto a corresponding detector element. This provides a configuration which further simplifies directing the laser beam portions towards the detector elements and consequently the detection of the same.

Preferably the diffractive elements form a matrix.

Preferably the diffraction matrix is arranged substantially parallel to the detector matrix, further simplifying detection of the laser beam portions.

Preferably the detector elements are attached, preferably adhered, to a separate support member. The support member may be constructed of a cheaper material than the detector elements and consequently reduces material costs.

Preferably the device further comprises amplifying means connected to each detector element, the amplifying means being connected to the processing means. This further increases the accuracy.

Preferably the amplifying means comprises an amplifying circuit attached to, preferably integrated on, the support plate. An advantage is that the amplifiers are close to the detector elements and consequently the wires are short, which reduces the capacitance, thus increasing the signal to noise ratio and consequently the accuracy.

According to a first embodiment of the present invention the diffractive elements comprises lens elements. Lens elements are relatively easy to manufacture and may be of a cheap material such as plastic.

According to a second embodiment of the present invention the diffractive elements comprises kinoform elements. By means of kinoform elements any desired shape of the laser beam portions may be achieved, thus facilitating a shape of the laser beam portion corresponding to the detector element, thus increasing accuracy.

Preferably the device further comprises a diffractive member arranged to focus the reflected laser beam prior to reaching the diffraction means. An advantage is that the diffractive means may have a smaller surface, consequently fitting the diffractive means and detector elements in a smaller space. The accuracy is further increased due to the focusing of the laser beam.

According to a first embodiment of the present invention the diffractive member comprises a lens member. A lens member is relatively easy to manufacture and may be of a cheap material such as plastic.

According to a second embodiment of the present invention the diffractive member comprises a kinoform member. By means of a kinoform member any desired shape of the laser beam portions may be achieved, thus facilitating a shape of the laser beam portion corresponding to the detector element, thus increasing accuracy.

Preferably each detector element is dimensioned such that the detecting surface is slightly larger than the projected laser beam.

Another object is achieved by a flyable body, for example a missile, grenade, robot or the like, for hitting a target by means of a from said target reflected laser beam comprising the laser target seeker device, the device being arranged to guide the body towards the target by means of said laser beam.

A further object is achieved by a system for hitting a target by means of a from said target reflected laser beam, comprising a laser designator for pointing out said target by means of a laser beam, and a flyable body.

Yet another object is achieved by a method for detecting a from an object reflected laser beam on detector elements, which is characterised by the step of diffracting the reflected laser beam into portions prior to detecting the optical power. An advantage is that the detector elements may be separated from each other offering space between them, which results in the fact that the wires may be drawn from each detector elements without affecting the detector surfaces, thus increasing the fill factor, and consequently the accuracy. There is further no need for long wires to each detector element which also reduces the capacitance and consequently increases signal to noise ratio, and thus the accuracy.

Preferably the method further comprises the step of directing the respective individual portions of the laser beam to a corresponding respective individual detector element. An advantage is that the accuracy is increased as there is no loss of radiation between the detectors.

Preferably the method further comprises the step of focusing the respective diffracted portions of the laser beam.

Preferably the method further comprises the step of focusing the laser beam prior to diffracting it. This gives the advantage that the detector elements may be of a smaller size, i.e. having a smaller detecting surface, than detector elements in a conventional detector matrix where the detector elements constitute the detector matrix, connected edge to edge in the same plane, reducing the amount of detector material and thus reduces costs. Another advantage is that this facilitates increasing the fill factor compared to a detector matrix of corresponding size, thus increasing accuracy, as wires to the detector elements may be drawn in the space between them. As each detector element is substantially smaller the capacitance is correspondingly smaller which increases the signal to noise ratio, and thus increases the accuracy.

DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Figure 1:
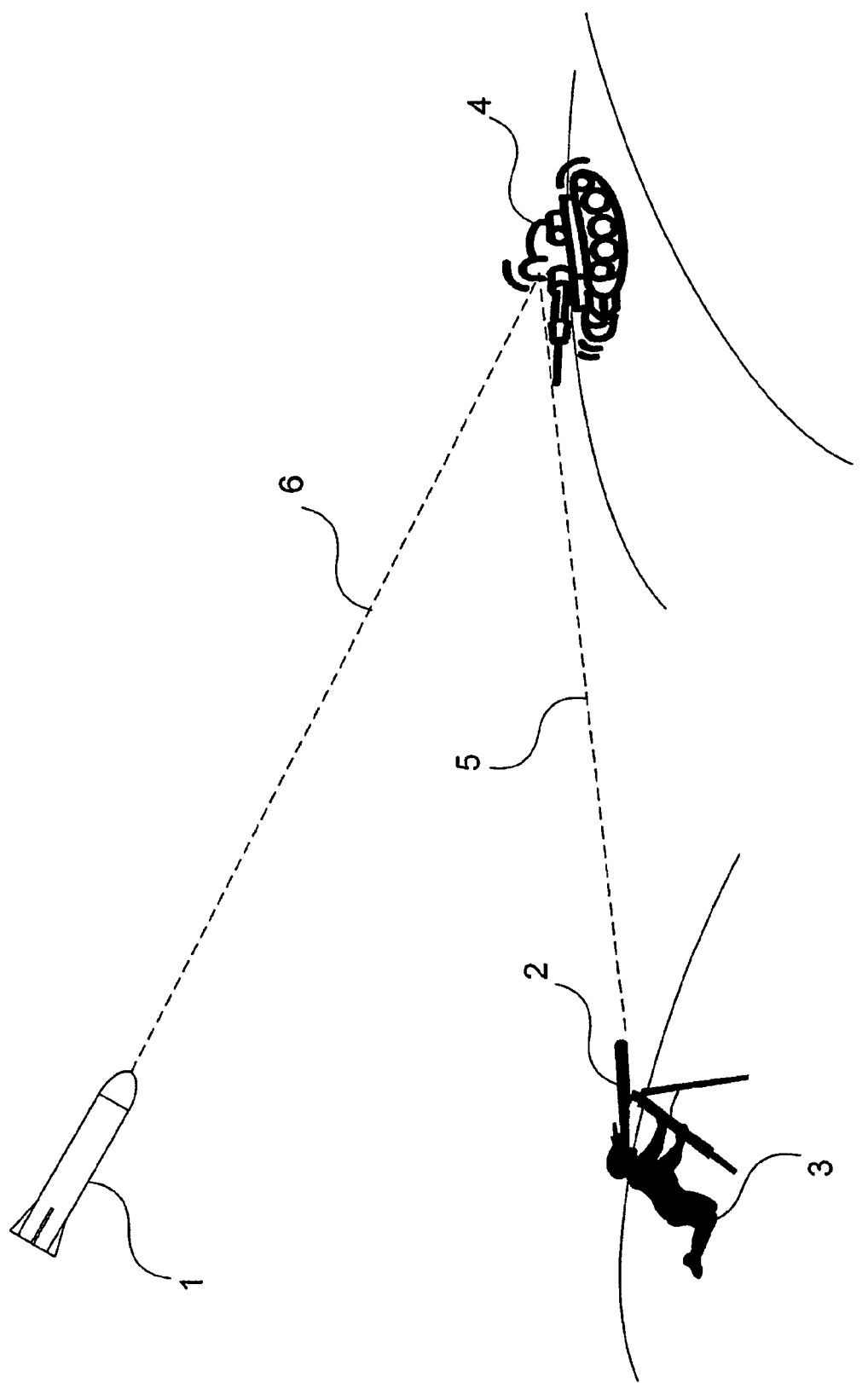
FIG. 1 shows schematically a perspective view of a system according to the present invention comprising a laser designator for pointing at an object, and a flyable body for striking said object by means of the from the object reflected laser beam.

FIG. 1 shows schematically a perspective view of a system according to the present invention comprising a laser designator 2 for pointing a laser beam 5 at and illuminating an object 4, and a flyable body 1, for example a missile, for striking said object 4 by means of the from the object reflected laser beam 6. An operator 3 has a laser generator which provides a laser beam with which the operator illuminates the target. A flyable body 1, for example a missile 1, is fired from a launcher (not shown) and a laser target seeker device arranged in the missile detects the reflected laser beam from the target by means of a detector. The missile homes on such reflected illumination by means of the laser target seeker device, intercepts and destroys the target.

Figure 2:
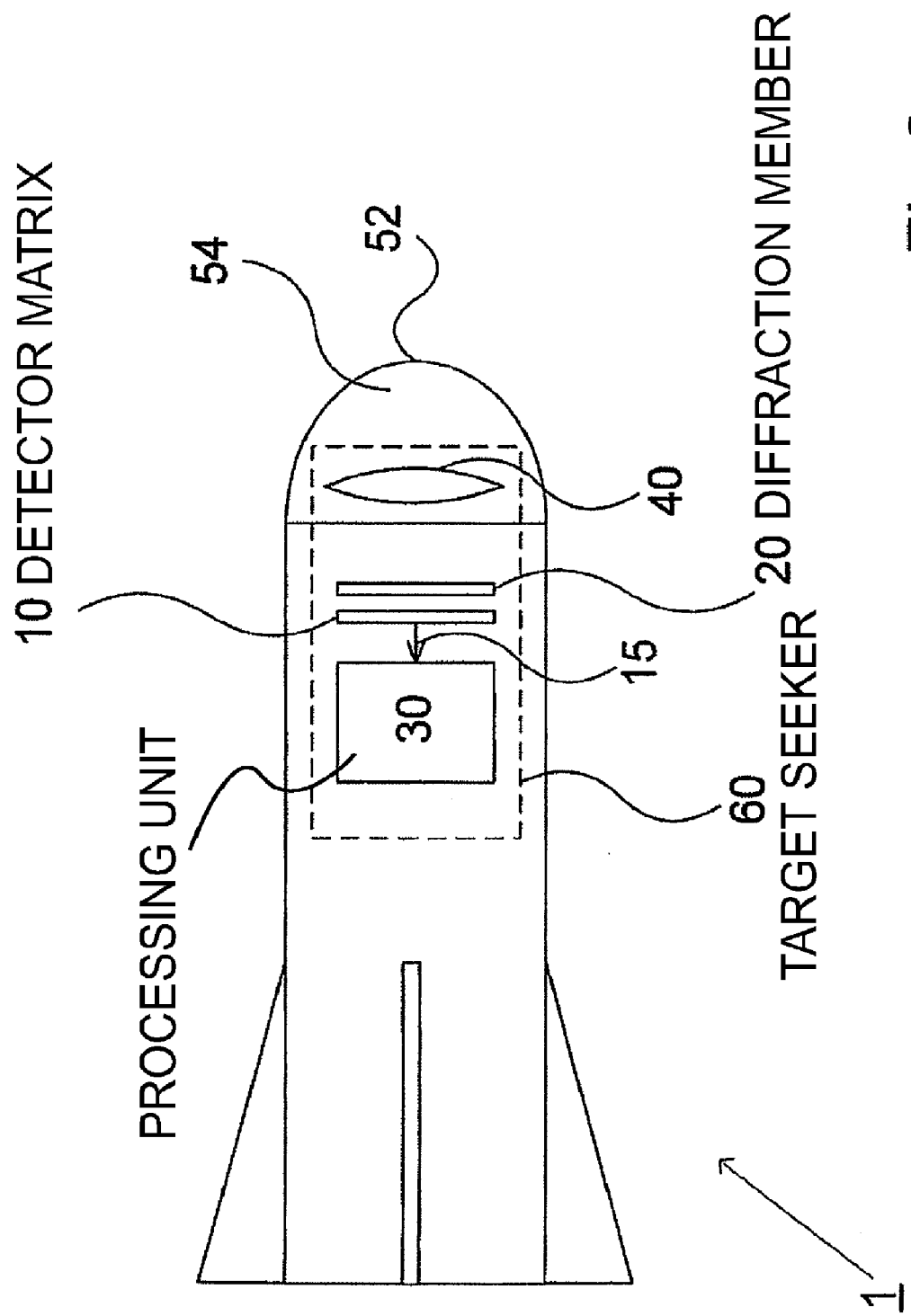
FIG. 2 shows schematically a side view of the flying body in FIG. 1, according to the present invention.

FIG. 2 shows schematically a side view of the flying body in FIG. 1, according to the present invention. The flying body 1 comprises a front side 52 with a window 54 or aperture. The flying body 1 comprises a laser target seeker 60 arranged within said body 1. The laser target seeker 60 comprises a lens member 40 provided in the area of the front end 52 of the body at the window 54 for focusing a from an object/a target reflected laser beam 6, a detector matrix 10 comprising detector elements 12, arranged to detect the reflected laser beam, processing means 30 arranged to determine the received radiation on the respective detector element in order to determine the origin of the laser beam 6, and diffraction means 20 arranged relative to the detector elements 12 and configured such that the reflected laser beam 6 is diffracted into portions prior to being detected by the detector elements 12, the detector elements being arranged to detect the respective portion.

Figure 3:
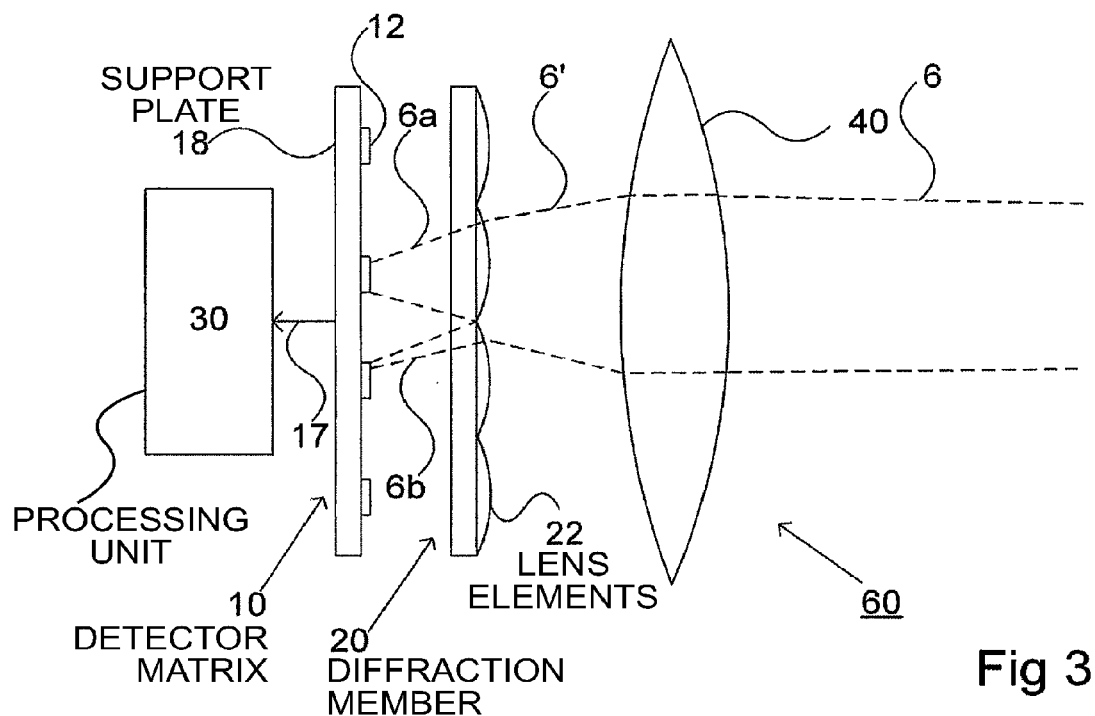
FIG. 3 shows schematically a side view of the laser target seeker according to a first embodiment of the present invention.

According to a first embodiment of the present invention the diffraction means comprises a lens matrix 20. FIG. 3 shows schematically a side view of the laser target seeker 60 according to the first embodiment of the present invention and an example of an incoming reflected laser beam 6 viewed in dotted lines. The detector matrix 10, the lens matrix 20, and the lens member 40 are preferably arranged substantially parallel relative to each other, the lens member 40 being arranged to receive a reflected laser beam 6 and dimensioned to focus the beam towards the lens matrix, the lens matrix being arranged to receive the focused laser beam 6' and dimensioned to diverge the laser beam 6' into portions towards the detector matrix 10.

The detector matrix 10 has a detecting side facing the lens matrix 20. The detector matrix 10 comprises detector elements 12, and a support plate 18, the detector elements 12 preferably being equally distributed on, and attached, preferably glued, to the plate 18. The detector elements are preferably semiconductors, more preferably photo diodes. The lens matrix 20 comprises lens elements 22 evenly distributed, the number of lens elements 22 preferably corresponding to the number of detector elements 12, where each lens element 22 is intended to co-act with a corresponding detector element 12. Each lens element 22 preferably forms a convex surface, at least on the side facing the lens member 40. Each detector element 12 is arranged to receive and detect the energy of the from a corresponding lens element 22 diffracted portion of the laser beam. The processing unit 30 is connected to the detector matrix and arranged to receive signals 17 from the detector elements 12 and to process the signals.

An advantage offered by the laser target seeker according to the first embodiment of the present invention is that the detector elements 12 of the detector matrix may be of a smaller size than of a conventional detector matrix where the detector elements 12 constitute the detector matrix 10, connected to each other in the same plane, the edges of the elements facing each other. The fact that the detector elements are smaller, i.e. the surface of each detector element only covers a portion of each field of the matrix, facilitates mounting the detector elements on a separate support plate 18 which could be of a cheaper material than the detector elements, and thus material cost would be reduced due to reduced amount of semiconductor material. Another advantage, which is a consequence of the smaller detectors, is that the fill factor is reduced due to the fact that, there is space on the surface of the support plate not covered by the detector elements, where the wires from each detector element may be drawn, the wires thus not affecting the detector surface of the detector elements, and the accuracy is consequently increased. As the detector element is substantially smaller the capacitance is correspondingly smaller which simplifies the electronic design and increases the signal to noise ratio, and thus increases the accuracy. There is further no need for long wires to each detector element which also reduces the capacitance and consequently increases signal to noise ratio, and thus the accuracy. Preferably the detector elements, i.e. the detecting surface of the elements, are dimensioned slightly larger than the projected portion of the laser beam, i.e. dimensioned such that the surface is slightly larger than the full portion of the laser beam projected on the detector surface, such that possible stray light is also detected, which also increases the accuracy.

Figure 4:
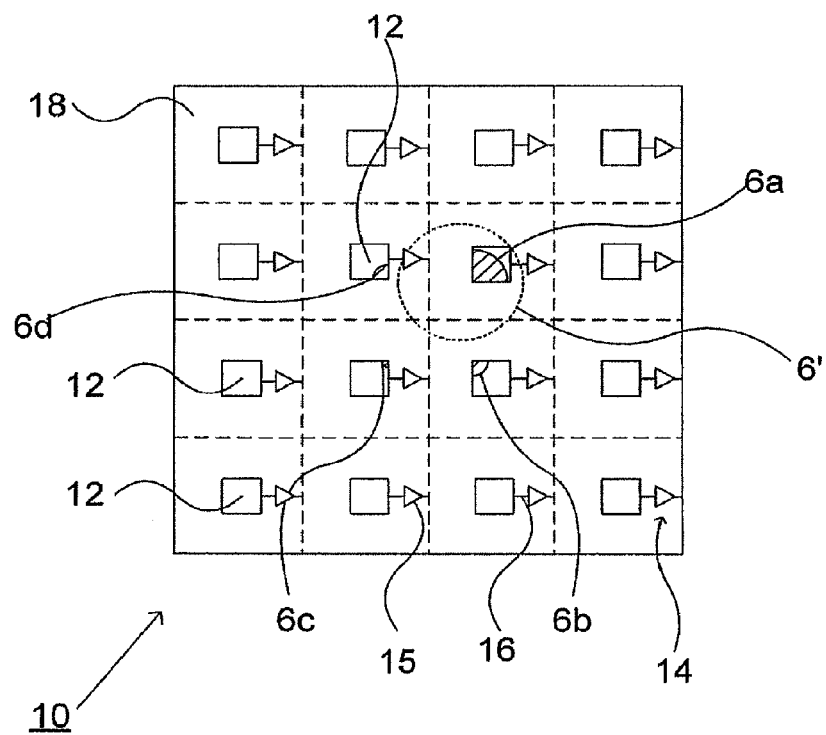
FIG. 4 shows schematically a plan view of a detector matrix of the laser target seeker in FIG. 3.

FIG. 4 shows schematically a plan view of the detector matrix 10. Preferably an amplifying circuit 14 is integrated for each detector element 12 on the support plate 18, said amplifying circuit comprising an amplifier element 15 and wires 16. This increases the signal to noise ratio as the circuits are located extremely close to the detector elements respectively, which is made possible due to the space offered on the support plate due to the small dimension of the detector elements, and thus the accuracy is increased. The amplifying circuits 14 are connected to the processing unit 30. The processing unit is arranged to process the output signals 17, see FIG. 3, from each detector element, the output signals being arranged to be fed via the respective amplifier element 15 to the processing unit 30. The projection on the lens matrix of the incoming laser beam viewed in FIG. 3 is shown as a dotted circle in FIG. 4. The laser beam diffracted into portions 6a, 6b, 6c, 6d by the lens elements 22 and the amount of each portion 6a, 6b, 6c, 6d being projected on the respective detector element 12 is viewed as hatches thereon.

Figure 5:
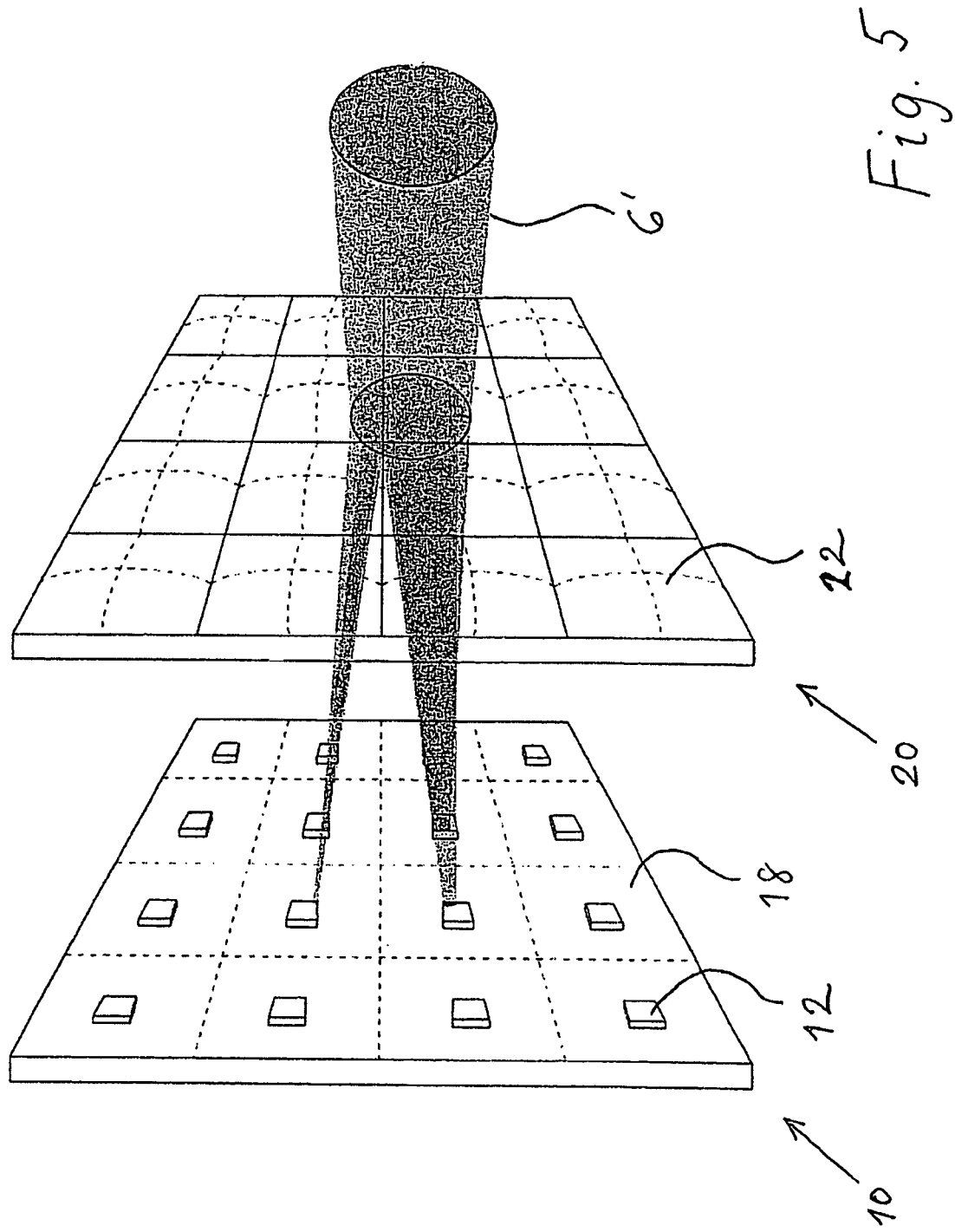
FIG. 5 shows schematically a perspective view of the main features of a laser target seeker according to a first embodiment of the present invention.

FIG. 5 shows schematically a perspective view of features of the laser target seeker 60 according to the first embodiment of the present invention, i.e. the detector matrix 10, the lens matrix 20 and the reflected laser beam 6 as it is diffracted through the lens elements 22 of the lens matrix 20 and each portion of the laser beam being projected on a corresponding detector element 12.

In the examples in FIGS. 3-5 the detector matrix has 4×4 detector elements, however the detector matrix 10 could have any suitable number of detector elements 12, where accuracy increases with the number of detector elements 12, given that the detector matrix 10 has the same dimensions. Each detector element 12 is preferably dimensioned such that it may detect the full portion of the laser beam 6', i.e. in the case when the laser beam is not diffracted into portions but is directed towards a single lens element the detector element is preferably dimensioned and arranged to detect the entire portion of the beam, i.e. the lens elements are dimensioned to be able to receive the whole laser beam 6, i.e. the lens member 40 is preferably arranged to focus the laser beam 6 down to a size approximately corresponding to a lens element 22. Alternatively the lens member may be arranged to focus the laser beam to a size larger than a lens element or smaller than a lens element. The detector elements may have any suitable shape, such as square, circular, or the like. The detector matrix, or rather the plate of the detector matrix, preferably has a shape corresponding to the shape of the cross section of the portion/portions of the laser beam. Preferably the support plate 18 is a separate member to which the detector elements are attached. Alternatively the support plate may be constituted by the detector elements. The lens elements may have any suitable shape, such as square, circular, or the like. The lens matrix preferably has square shape. In the example in FIG. 3 the lens matrix has 4×4 lens elements 22, to correspond to the 4×4 detector elements 12, however the lens matrix 20 could have any suitable number of lens elements 22.

Figure 3A:
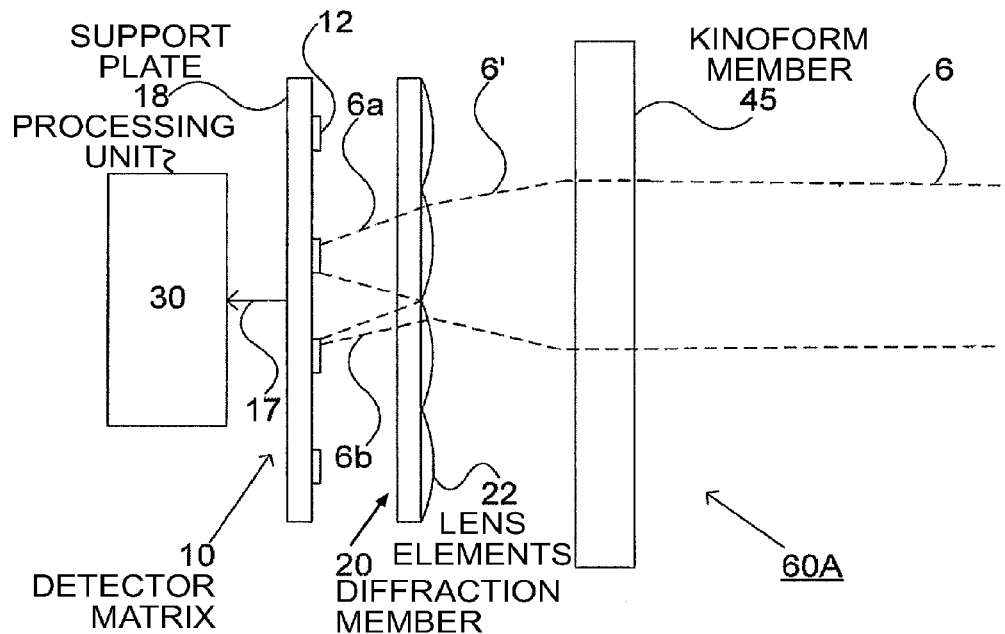
FIG. 3A shows schematically a side view of the laser target seeker according to an alternative variant of the first embodiment of the present invention.

In FIG. 3 the laser target seeker 60 comprises a lens member 40. FIG. 3A shows an alternative variant of the second embodiment of the laser target seeker 60A of the present invention where the lens member 40 is replaced by a kinoform member 45, i.e. a kinoform phase plate, which is a beam shaping member that enable a controlled modification of the focal plane intensity profile. By using a kinoform member 45 any desired shape of the incoming reflected laser beam may be created, for example a square shape, to correspond to the shape of the lens matrix 20 and lens elements 22 of the lens matrix 20.

Figure 3B:
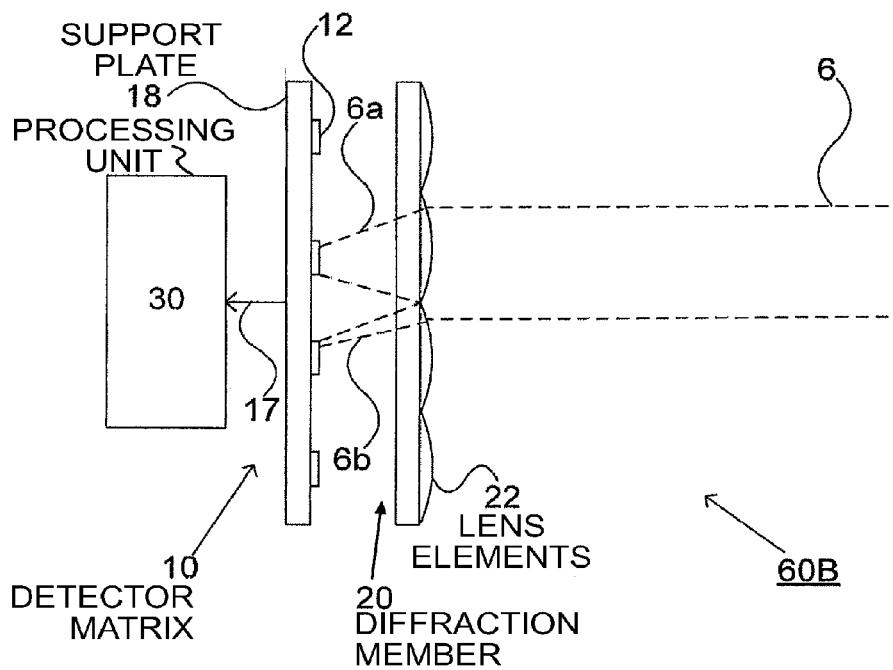
FIG. 3B shows schematically a side view of the laser target seeker according to another alternative variant of the first embodiment of the present invention.

FIG. 3B shows another alternative variant of the second embodiment of the laser target seeker 60B of the present invention, where the lens member 40 of the laser target seeker 60B simply has been excluded, as the laser target seeker would not function without it.

By detector matrix is meant a plane member comprising n×n detector elements evenly distributed on the plane member and consequently being in the same plane. By lens matrix is meant a plane member comprising n×n lens elements evenly distributed on the plane member and consequently being in the same plane.

During operation the laser target seeker according to the first embodiment of the present invention is intended to function as follows, FIGS. 3-5 depicting an example. A reflected laser beam 6 is focused by the lens member 40 and projected on the lens matrix. In this example the focused laser beam 6' hits different amounts of four lens elements 22 of the lens matrix 20. Each of the four lens elements 22 hit by the focused laser beam 6' diffracts and focuses the laser beam 6' to a corresponding detector element 12 on the detector matrix 10. The amount of energy of each diffracted portion 6a, 6b, 6c, 6d of the laser beam is detected by the respective detector element 12. The output signals from each detector element is fed via the respective amplifier elements of the amplifying circuit 14 to processing means 30 and are processed in a conventional manner. By measuring and comparing the signal intensity from each detector element, i.e. the amount of optical power/energy ending up on each of the four elements, it is possible to determine where the point of balance of the laser reflex is located and thus in which direction to guide e.g. a missile. Guiding of the missile or the like is intended to be provided by guide means.

According to a second embodiment of the present invention the diffraction means 70 comprises a diffractive member 70 in the shape of a kinoform member 70 comprising kinoform elements, i.e. kinoform phase plates, which are beam shaping elements that enable a controlled modification of the focal plane intensity profile. The kinoform member 70 preferably is a substantially plane plate. In analogy with the first embodiment, the detector matrix 10, the kinoform member 70, and the lens member 40 are preferably arranged substantially parallel relative to each other, the lens member 40 being arranged to receive a reflected laser beam 6 and dimensioned to focus the beam towards the kinoform member 70, the kinoform member being arranged to receive the focused laser beam 6' and dimensioned to diffract the laser beam 6' into predetermined shaped portions towards the detector matrix 10.

The detector matrix 10 has a detecting side facing the kinoform member 70. The detector matrix 10 comprises detector elements 12, and a support plate 18, the detector elements 12 preferably being equally distributed on, and attached, preferably glued, to the plate 18. The detector elements are preferably semiconductors, more preferably photo diodes. The kinoform member 70 comprises kinoform elements evenly distributed, the number of kinoform elements 72 preferably corresponding to the number of detector elements 12, where each kinoform element 72 is intended to co-act with a corresponding detector element 12. Each kinoform element 72 preferably forms a surface having properties such that the laser beam is diffracted to a corresponding detector element 12 and is projected at the detector element with a desired shape, the shape depending on the properties of the kinoform element. Each detector element 12 is in analogy with the first embodiment arranged to receive and detect the energy of the from a corresponding kinoform element diffracted portion of the laser beam. The processing unit 30 is connected to the detector matrix and arranged to receive signals 17 from the detector elements 12 and to process the signals, also in analogy with the first embodiment.

The influence on the phase of the laser beam is achieved by variation of the refractive index of the kinoform or through a shallow surface relief in one surface thereof. By means of the kinoform any desired light intensity pattern may be created. The kinoform is intended to be calculated in a computer such that the wavefronts of the light leaving the kinoform gets a certain desired shape. The predetermined light intensity patterns are intended to be created by means of the diffraction of the light from the kinoform. High quality kinoforms may be fabricated, for example micro surface relief lenses, optical correction plates and certain grids and beam splitters.

Figure 7:
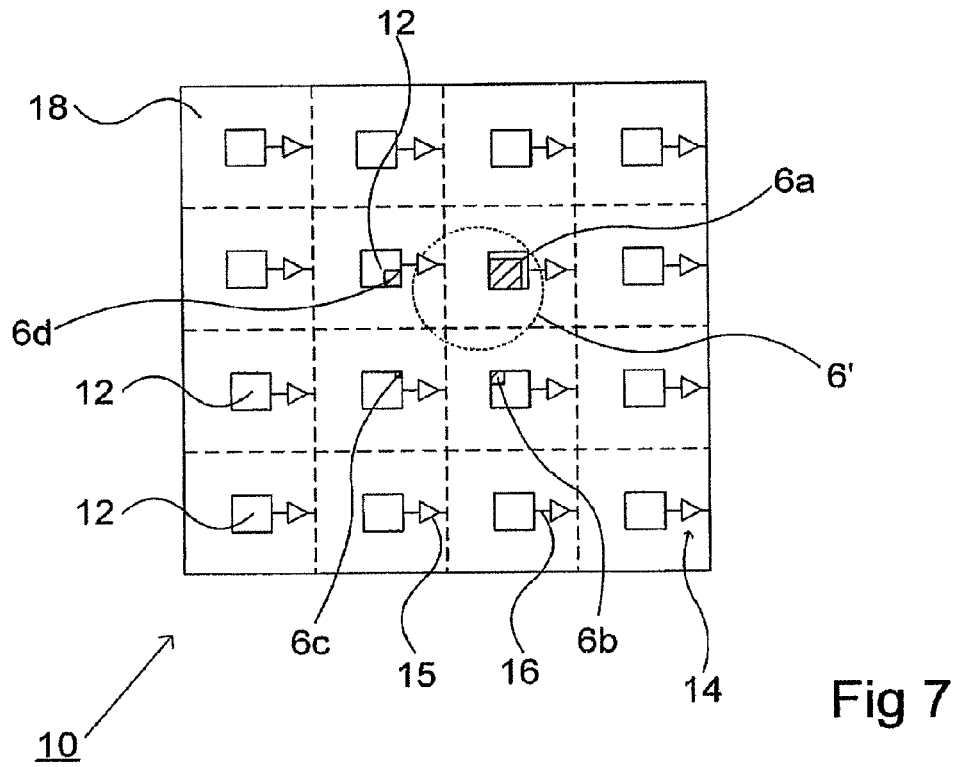
FIG. 7 shows schematically a plan view of a detector matrix of the laser target seeker in FIG. 6.

Kinoforms are particularly suitable for laser light. An advantage by using a diffractive member such as a kinoform is that any desired light intensity pattern may be created, which means that the pattern may be shaped exactly as the detector element, for example a square shape as shown in FIG. 7, increasing the accuracy. The shape of the laser beam portions projected on the detector elements is thus determined in advance, and thus detector elements of any shape may be used. The advantages mentioned above, related to the first embodiment of the present invention also applies to this, the second embodiment of the present invention.

Figure 6:
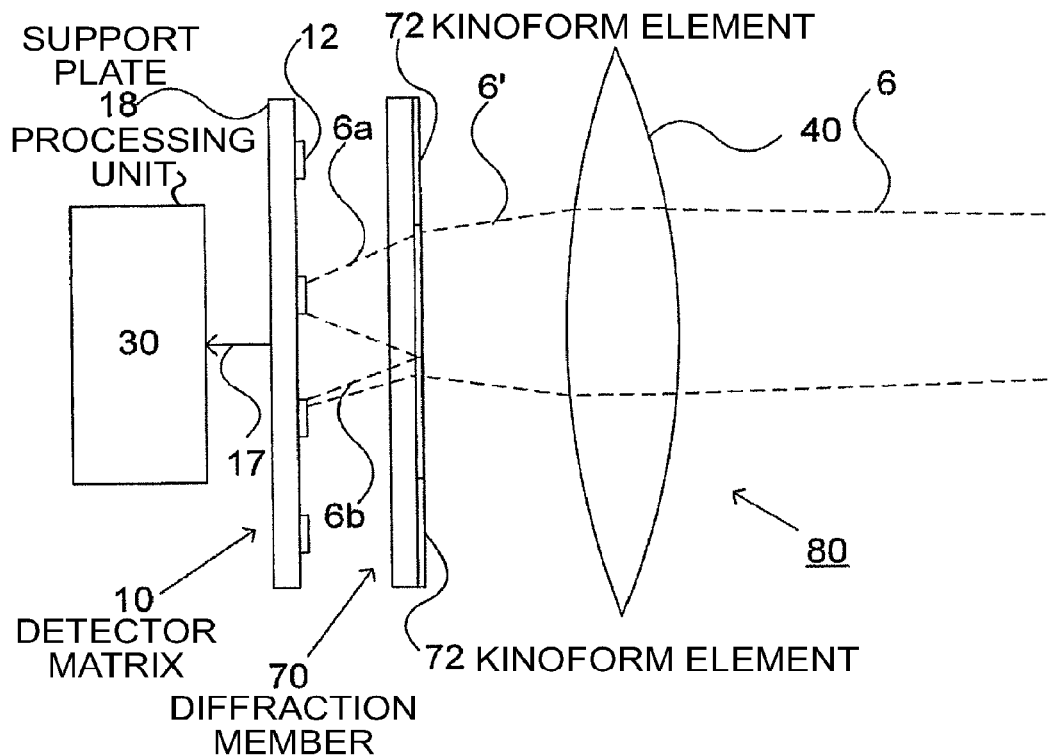
FIG. 6 shows schematically a side view of a laser target seeker according to a second embodiment of the present invention.
Figure 6A:
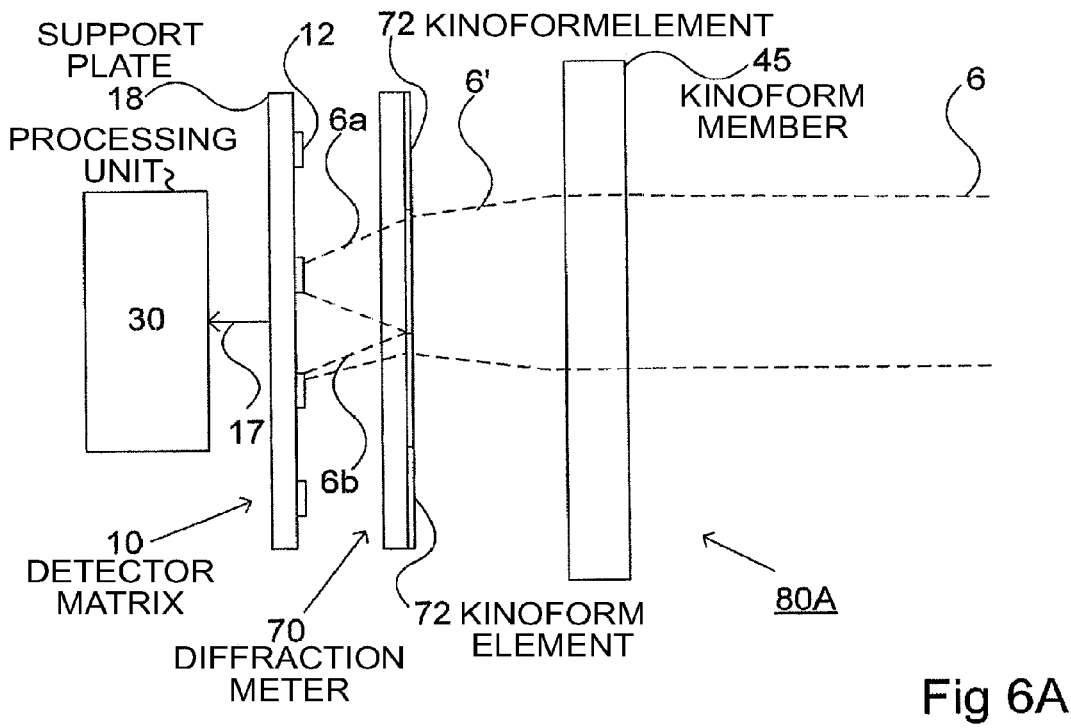
FIG. 6A shows schematically a side view of a laser target seeker according to an alternative variant of the second embodiment of the present invention.

In FIG. 6 the laser target seeker 80 comprises a lens member 40. FIG. 6A shows an alternative variant of the second embodiment of the laser target seeker 80A of the present invention where the lens member 40 is replaced by a kinoform member 45, i.e. a kinoform phase plate, which is a beam shaping member that enable a controlled modification of the focal plane intensity profile. By using a kinoform member 45 any desired shape of the incoming reflected laser beam may be created.

Figure 6B:
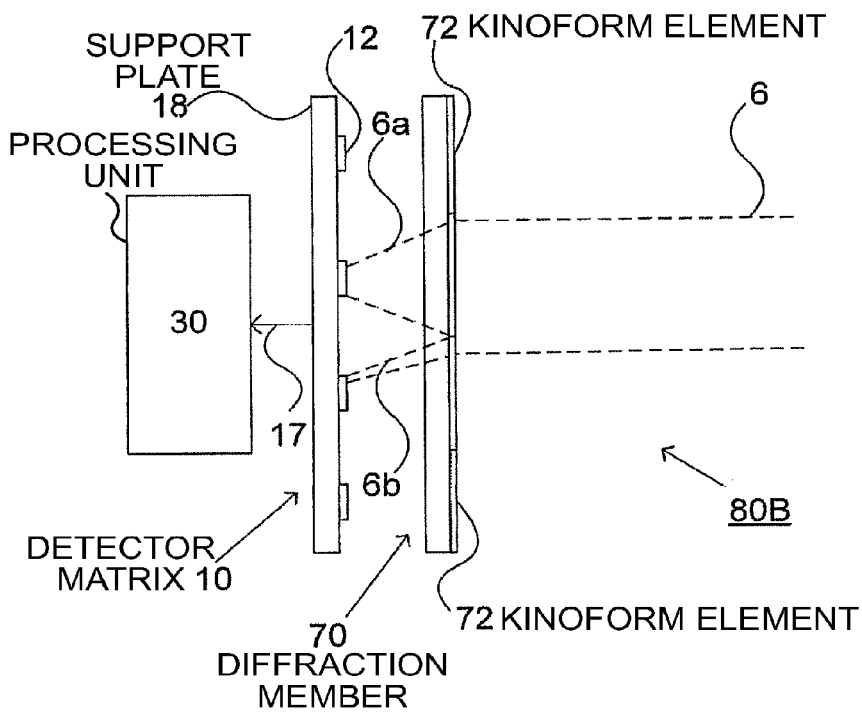
FIG. 6B shows schematically a side view of a laser target seeker according to another alternative variant of the second embodiment of the present invention.

FIG. 6B shows another alternative variant of the second embodiment of the laser target seeker 80B of the present invention, where the lens member 40 of the laser target seeker 80B simply has been excluded, as the laser target seeker would function without it.

During operation the laser target seeker according to the second embodiment of the present invention functions in basically the same way as in the first embodiment described above.

Figure 8:
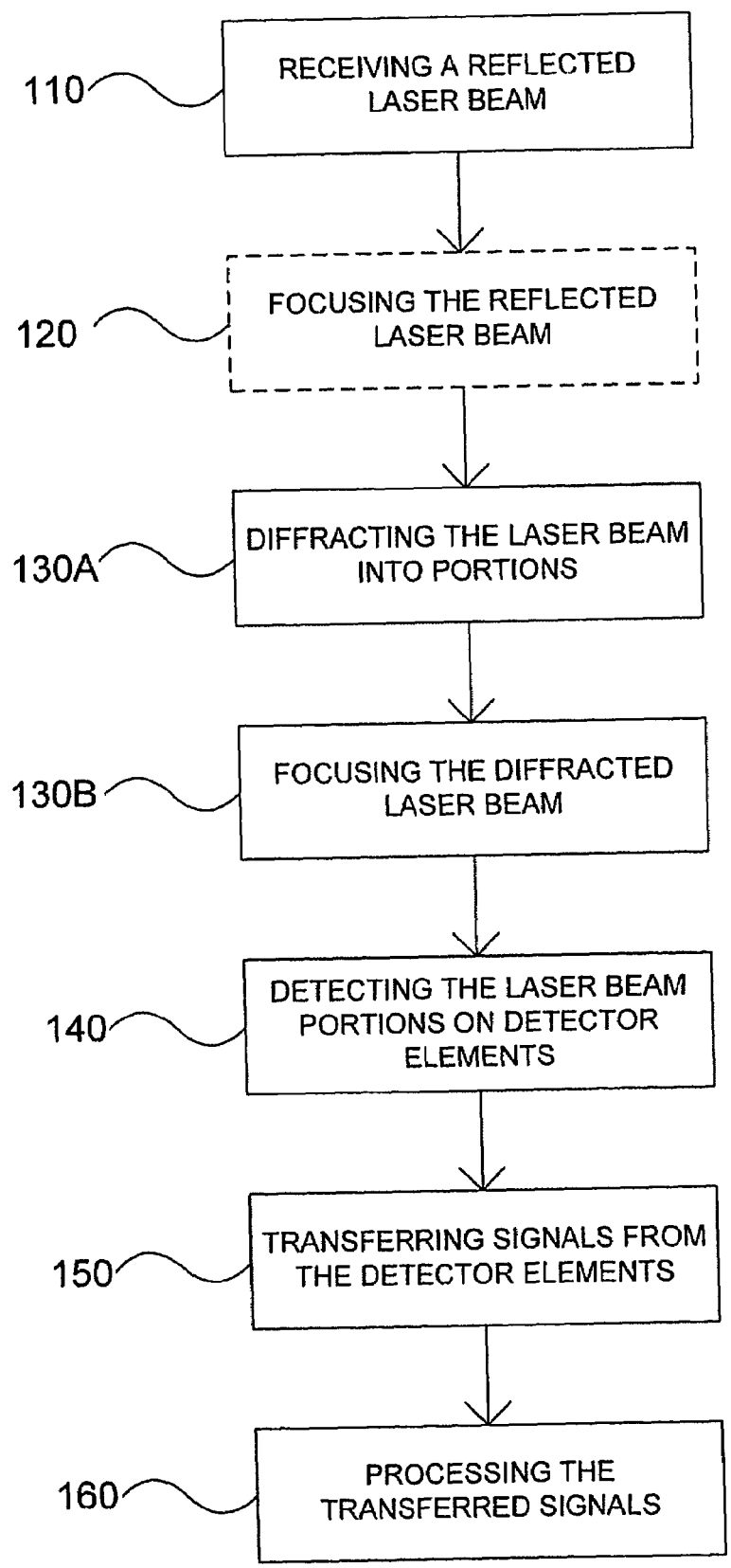
FIG. 8 shows a flow chart of the method according to the present invention for detecting a reflected laser beam.

FIG. 8 shows a flow chart of the method according to the present invention for detecting a reflected laser beam.

The method for detecting a from an object reflected laser beam on detector elements, comprising the steps of: receiving the, from the object, reflected laser beam 110; focusing the laser beam prior to diffracting it 120; diffracting the reflected laser beam into portions 130A prior to detecting the optical power; focusing the respective diffracted portions of the laser beam 130B; detecting the optical power of the reflected laser beam on at least one of said detector elements 140; transferring signals corresponding to said optical power from the detector elements 150 for processing; and processing the transferred signals 160 for determining the received radiation on the respective detector element in order to determine the origin of the laser beam.

The step of focusing the laser beam prior to diffracting it is optional, but preferable. The step of diffracting the reflected laser beam into portions 130A prior to detecting the optical power and the step of focusing the respective diffracted portions of the laser beam 130B are preferably performed substantially at the same time.

According to an aspect of the present invention a kinoform member may be used in a laser target seeker. An advantage of using a kinoform member in a laser target seeker is that any desired shape of a from an object reflected laser beam may be achieved thus facilitating increasing the accuracy.

Where technical features mentioned in any claim are followed by reference signs, those reference signs have been included for the sole purpose of increasing the intelligibility of the claims and accordingly, such reference signs do not have any limiting effect on the interpretation of each element identified by way of example by such reference signs.

I claim:

1. A laser target seeker device arranged to receive a laser beam reflected from an object, said device comprising:
   detector elements arranged to detect the reflected laser beam;
   a processor arranged to determine the received radiation on the detector elements to determine the origin of the reflected laser beam; and
   a diffractor operative to diffract the reflected laser beam into portions prior to being detected by the detector elements, wherein the detector elements are arranged to detect the portions.

2. The device according to claim 1, wherein each portion of the reflected laser beam is directed to a corresponding respective individual detector element.

3. The device according to claim 1, wherein the diffractor comprises a focusing element configured such that the diffracted portions of the reflected laser beam are focused prior to being detected by the detector elements.

4. The device according to claim 1, wherein the detector elements form a detector matrix.

5. The device according to claim 1, wherein the diffractor comprises diffractive elements, each diffraction element being arranged to focus a portion of the reflected laser beam onto a corresponding detector element.

6. The device according to claim 5, wherein the diffractive elements form a diffraction matrix.

7. The device according to claim 6, wherein the diffraction matrix is arranged substantially parallel to the detector matrix.

8. The device according to claim 5, wherein the diffractive elements comprise lens elements.

9. The device according to claim 5, wherein the diffractive elements comprise kinoform elements.

10. The device according to claim 1, further comprising:
    support members operative to support the detector elements, wherein each detector element is attached to a separate support member.

11. The device according to claim 10, further comprising:
    an amplifier connected to each detector element, the amplifier being connected to the processor.

12. The device according to claim 11, wherein the amplifier comprises an amplifying circuit attached to the support member.

13. The device according to claim 12, wherein the amplifying circuit is integrated on the support member.

14. The device according to claim 10, wherein each detector element is adhered to the separate support member.

15. The device according to claim 1, further comprising:
    a diffractive member arranged to focus the reflected laser beam prior to reaching the diffractor.

16. The device according to claim 15, wherein the diffractive member comprises a lens member.

17. The device according to claim 15, wherein the diffractive member comprises a kinoform member.

18. The device according to claim 1, wherein each detector element is dimensioned such that the detecting surface is slightly larger than the projected laser beam.

19. A system for hitting a target by means of a laser beam reflected from said target, the system comprising
    a laser designator for pointing out said target utilizing a laser beam, and
    a flyable body comprising a laser target seeker device comprising detector elements arranged to detect the reflected laser beam, a processor arranged to determine the received radiation on the detector elements to determine the origin of the reflected laser beam, and a diffractor operative to diffract the reflected laser beam into portions prior to being detected by the detector elements, wherein the detector elements are arranged to detect the portions wherein the device is arranged to guide the body towards the target utilizing said reflected laser beam.

20. A method for detecting on detector elements a laser beam reflected from an object, the method comprising:
    receiving the reflected laser beam from the object;
    detecting the optical power of the reflected laser beam on at least one of said detector elements;
    transferring signals corresponding to said optical power from the detector elements for processing;
    processing the transferred signals for determining the received radiation on the respective detector element in order to determine the origin of the reflected laser beam; and
    diffracting the reflected laser beam into portions prior to detecting the optical power.

21. The method according to claim 20, further comprising:
    directing the respective individual portions of the reflected laser beam to a corresponding respective individual detector element.

22. The method according to claim 20, further comprising:
    focusing the respective diffracted portions of the reflected laser beam.

23. The method according to claim 20, further comprising:
    focusing the reflected laser beam prior to diffracting.

24. The method according to claim 20, wherein the reflected laser beam is diffracted with a kinoform member.

* * * * *

UNITED STATES PATENT AND TRADEMARK OFFICE
CERTIFICATE OF CORRECTION

PATENT NO. : 7,659,494 B2
APPLICATION NO. : 11/528566
DATED : February 9, 2010
INVENTOR(S) : Mikael Lindgren It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 262 days.

Signed and Sealed this

Fourth Day of January, 2011

David J. Kappos
*Director of the United States Patent and Trademark Office*